United States Patent [19]

Jackson

[11] Patent Number: 4,771,192
[45] Date of Patent: Sep. 13, 1988

[54] DIGITAL CLIP AND GAIN CIRCUIT

[75] Inventor: Richard A. Jackson, Nevada City, Calif.

[73] Assignee: The Grass Valley Group, Inc., Grass Valley, Calif.

[21] Appl. No.: 931,382

[22] Filed: Nov. 14, 1986

[51] Int. Cl.$^4$ .................. G06G 7/12; G06G 7/00; H04N 5/52; H04N 5/14

[52] U.S. Cl. ...................... 307/493; 307/494; 307/498; 307/529; 358/174; 358/166; 358/183; 328/146; 328/187

[58] Field of Search ............... 358/183, 174, 166, 160; 307/493, 494, 498, 555, 558, 262, 264, 268, 529; 328/14, 146, 181, 185, 187, 144, 145

[56] References Cited

U.S. PATENT DOCUMENTS

| | | | |
|---|---|---|---|
| 3,619,495 | 11/1971 | Ito et al. .............................. | 358/183 |
| 3,673,324 | 6/1972 | Ito et al. .............................. | 358/183 |
| 3,736,377 | 5/1973 | Warren, Jr. et al. ............... | 358/183 |

Primary Examiner—Stanley D. Miller
Assistant Examiner—Trong Quang Phan
Attorney, Agent, or Firm—Francis I. Gray

[57] ABSTRACT

A digital clip and gain circuit compares an input waveform with a clip level to produce a difference waveform. The difference waveform is shifted by an exponent representing a power of two portion of a gain value, and is then multiplied by a mantissa representing a fractional portion of the gain value. The resulting product is input to a lookup table which provides level shifting and limiting to output a control waveform. A parallel overflow logic circuit processes the difference waveform and the exponent portion of the gain value to determine if the resulting product is out of range. If the resulting product is out of range, the lookup table outputs either a maximum or a minimum value for the control waveform according to the sign of the difference waveform.

7 Claims, 4 Drawing Sheets

DIGITAL CLIP AND GAIN CIRCUIT

BACKGROUND OF THE INVENTION

The present invention relates to clip and gain circuits, and more particularly to a digital clip and gain circuit for generating a new control waveform from an input waveform.

In the television arts clip and gain circuits are used for video processing where an input waveform is compared with a reference level and the difference value is amplified, level shifted and limited to generate a control waveform. A typical clip and gain circuit is shown in FIG. 1. Typical examples of applications for clip and gain circuits are "wipe", "self-key" and "depth" effects.

A wipe is a method by which two video pictures are combined into one output picture by spatially dividing the output into two or more separate spaces, each of which contains the corresponding video from one of the inputs. FIG. 2 shows a simple "split-screen" wipe, where the left side of the output picture consists of the left side of a first input and the right side of the output picture consists of the right side of a second input. This effect is accomplished by first generating a ramp waveform which is a low voltage in areas corresponding to the left side of the picture and a high voltage in areas corresponding to the right side of the picture, as illustrated in FIG. 3. This waveform becomes the input to the clip and gain circuit where it is compared with a reference, or clip, voltage and the difference value is amplified. After level shifting and limiting to an appropriate range, the resulting output may be used to drive the control input of a mixer whose two inputs are the two pictures.

In areas where the ramp waveform is much lower than the clip voltage, the output of the comparator, or subtracter, is negative. The negative output is amplified and converted to a control voltage which enables the mixer to turn on the first picture's video. Conversely, where the ramp waveform is much higher than the clip voltage, the output of the comparator is positive. The positive output is similarly converted to a control voltage which enables the mixer to turn on the second picture's video. When the ramp waveform is close in level to the clip voltage, the output of the comparator is close to zero which, depending upon the gain of the amplifier, may not result in an output level that fully drives the mixer fully to either limit, i.e., the mixer outputs some proportional mix of the two input pictures. This proportional mixing, which occurs at the boundaries between two pictures, is called "softness" and provides for a graceful transition from one picture to another. The width of the softness region depends on the gain of the amplifier and the slope of the ramp waveform. By providing operator control over the gain and clip settings the transition region may be moved left to right in space and its width may be varied.

In the self-key example one of the two inputs to the mixer is also an input to the comparator, as shown in FIG. 4. When the level in the picture is below that of the clip voltage, the resulting control waveform causes the mixer to output the first picture, and when the level in the picture is above the clip voltage, the resulting control waveform causes the mixer to output the second picture. In this way bright, or high level, areas of the second picture take priority over the first picture's video, while dark, or low level, areas of the second picture are subordinated to the first picture. If the second picture is lettering on a dark background as shown in FIG. 5, then the resulting picture is those letters over the first picture.

In another example the input waveform is a signal whose voltage is proportional to the second picture's depth, or apparent distance from the viewer in the picture, or an object in the picture. When the input waveform is generated such that "near" depths are high levels and "far" depths are low levels relative to the clip voltage, the second picture is made to "disappear" into the first picture. In this case the clip voltage represents a depth beyond which the viewer could not see the second picture. By reducing the gain of the amplifier such that the transition distance is quite large, a gradual "fading" of the second picture results as it appears to recede from the viewer, enhancing the illusion of depth.

In conventional analog implementations the major design obstacle is noise, since any noise appearing on the input waveform near the clip voltage is amplified and causes false or uneven mixing between the two pictures at the transition point. In digital systems random noise is less of a problem, especially if the input waveform has been digitally generated, but the input waveform must generally be represented by many bits to avoid similar effects due to quantization noise. If not enough precision is used for the input waveform representation, a gain large enough to make the desired small transition region uses up all of the bits and the output of the control waveform to the mixer jumps from the off, picture one, level to the on, picture two, level without any intervening steps. On diagonal edges this causes the transition to look "jaggy", or stair-stepped, instead of a more pleasing fade from one picture to the other. As the number of bits used in the input waveform increases, this distortion becomes less pronounced, but the cost of the clip and gain circuit rises due to the complexity and cost of a larger multiplier.

Another implementation difficulty in digital systems is the desire to have a wide range of gain values. A typical clip and gain circuit has gain values as low as 0.00, circuit off, and as high as 512.0 to 1024.0. Additionally the fractional precision needed at small gains is high, often eight or more bits, to avoid "cogging", or a noticeable jump in transition width as the gain is smoothly varied. The combined number of bits required for the range and fraction precision of the gain values also makes the circuit more costly and complex. This is particularly true of the gain multiplier since the number of bits required at the output of the multiplier is the sum of the number of bits at the two inputs. For a typical circuit the input waveform may need as many as twenty bits, which becomes twenty-one after the comparator, and the gain value may need as many as eighteen bits for an output precision of thirty-eight bits. A typical mixer control waveform is only ten bits, but the full thirty-eight bits must be generated to insure that over range values are properly limit detected and clipped.

What is desired is a digital clip and gain circuit which minimizes jaggies and cogging without the need for wide dynamic range multipliers to reduce the cost and complexity of the implementation.

SUMMARY OF THE INVENTION

Accordingly the present invention provides a digital clip and gain circuit which treats the gain multiplication in two steps. The output of a comparator which performs the comparison of an input waveform with a clip level is input into a gain stage having two parts, an exponent shifter followed by a mantissa multiplier. The exponent shifter shifts the comparator output by some number of bits and the mantissa multiplier performs a multiplication within the range of 0.0 to just less than 2.0. The desired gain value is input as a desired power of two multiple to the exponent shifter and as a fractional gain portion to the mantissa multiplier. The output of the comparator is also input to an overflow logic circuit to test for input values which will be over limit after gain multiplication. The output of the mantissa multiplier, the sign bit from the comparator and the output of the overflow logic circuit are input to a lookup table which provides level shifting and limiting of the mantissa multiplier output to produce a new control waveform.

DESCRIPTION OF THE PREFERRED EMBODIMENT

Figure 1:
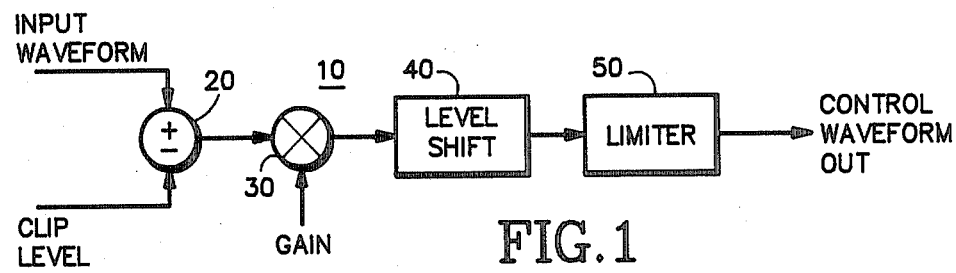
FIG. 1 is a general block diagram of a clip and gain circuit.
Figure 2:
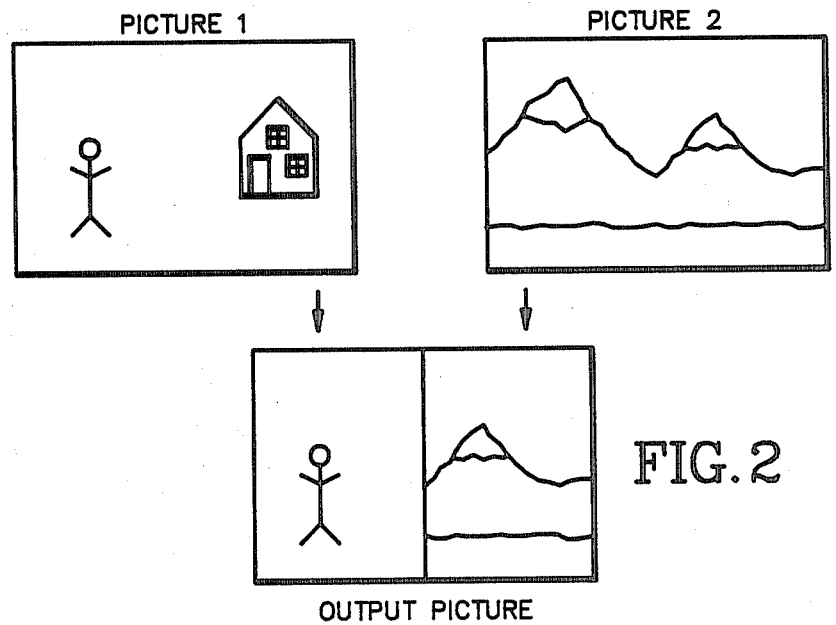
FIG. 2 is a pictorial illustration of a wipe effect.
Figure 3:
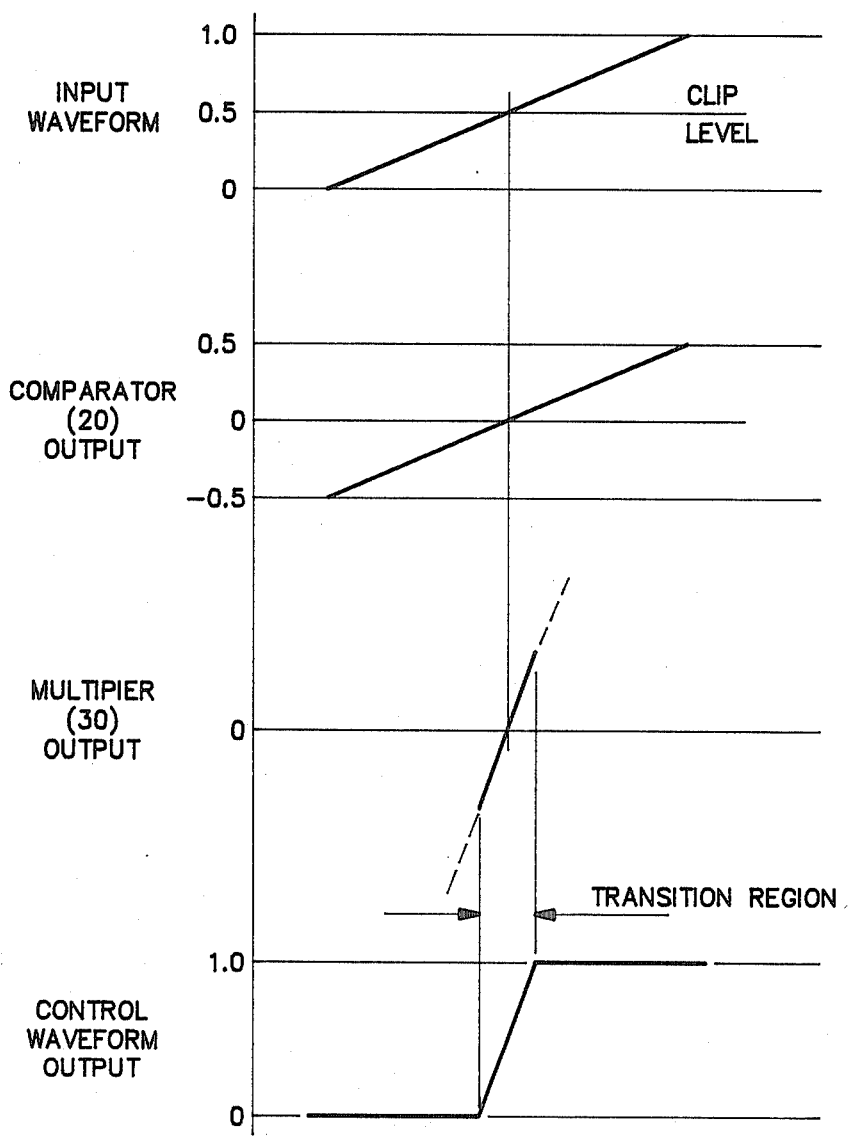
FIG. 3 is a waveform diagram illustrating the operation of a clip and gain circuit.
Figure 4:
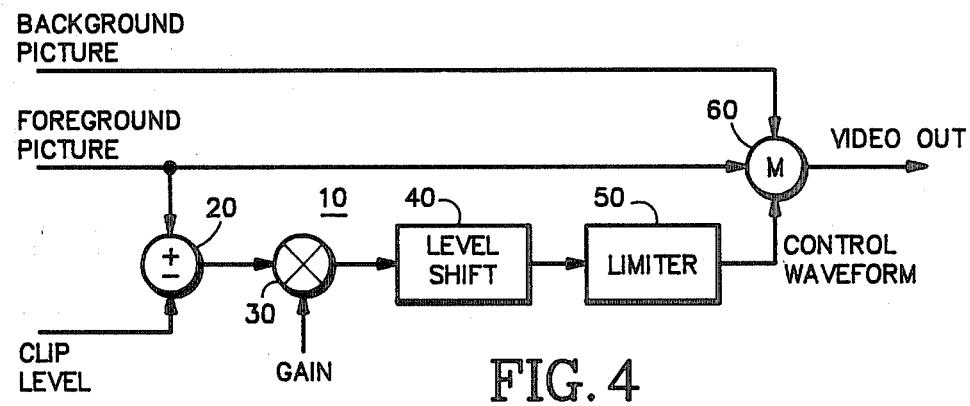
FIG. 4 is a general block diagram of a clip and gain circuit used to produce a self-key effect.
Figure 5:
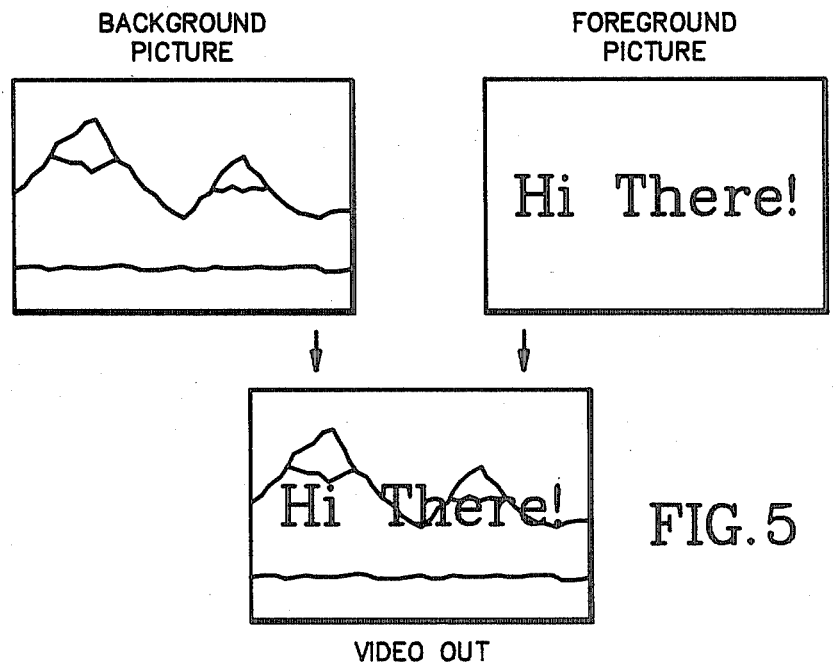
FIG. 5 is a pictorial illustration of a self-key effect.
Figure 6:
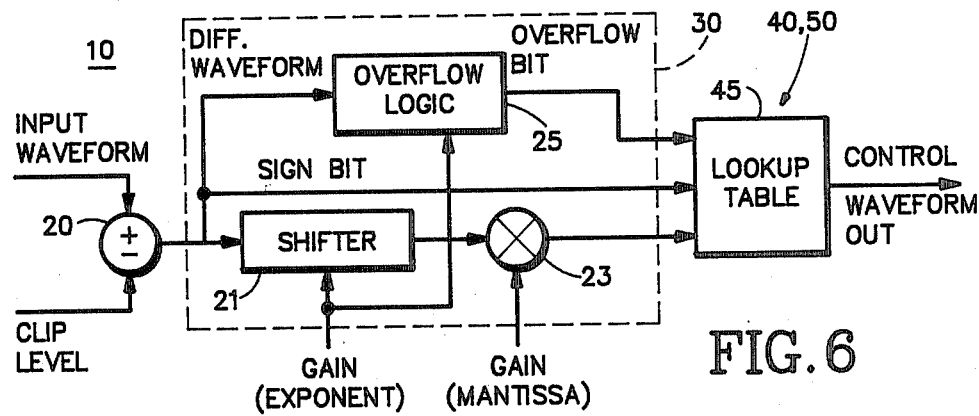
FIG. 6 is a detailed block diagram of the clip and gain circuit of FIG. 1 according to the present invention.

Referring now to FIGS. 1, 4 and 6 an input waveform and a clip level are input to a comparator 20. The output of the comparator 20 is a difference waveform which is negative where the input waveform is less than the clip level and positive where the input waveform is greater than the clip level. The difference waveform is input to a multiplier, or gain, stage 30. The output of the gain stage 30 is input to a level shifter 40, the output of which is input to a limiter 50 to produce a new control waveform at the output. The control waveform is subsequently input to a mixer 60 where two video pictures are combined as determined by the control waveform. For best results the clip and gain circuit is digital to eliminate the analog noise problems where the input waveform is close in value to the clip level. Typically the input waveform is twenty bits, and the output of the comparator 20 is twenty bits plus a sign bit for a total of twenty-one bits.

The difference waveform is input to a shifter 21 in the gain stage 30. The gain value is divided into an exponent gain value which is a multiple of two and a mantissa gain value which is the fractional portion of the gain value. The exponent gain value is input to the shifter 21 to shift the difference waveform accordingly, corresponding to multiplying the difference waveform by a power of two. The output of the shifter 21 is then input to a multiplier 23 where it is multiplied by the mantissa gain value which has a value between 0.0 and just less than 2.0. The resulting output from the multiplier 23 together with the sign bit from the comparator 21 are input to a lookup table 45 which provides the level shifting and limiting functions to produce the new control waveform at the output.

Figure 7:
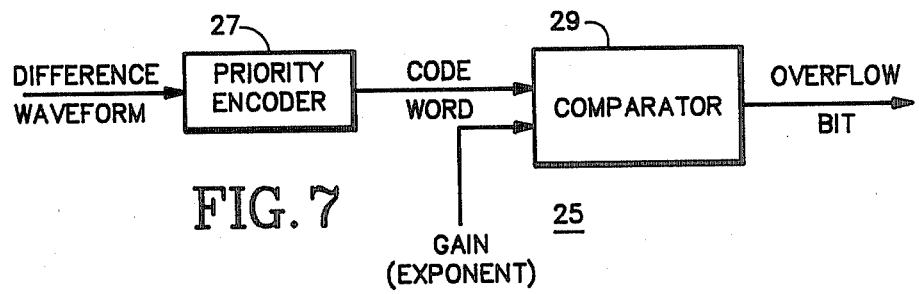
FIG. 7 is a block diagram of the overflow logic for the clip and gain circuit of FIG. 6 according to the present invention.

The difference waveform is also input to an overflow logic circuit 25. The difference waveform is combined with the exponent gain value to determine if the result of the multiplication by the gain stage 30 will produce an out of limits result. An overflow bit is set if the multiplication would produce such an out of limits value. The overflow bit is input to the lookup table 45 together with the sign bit and the output of the lookup table is set to either the maximum or minimum value according to the sign bit, overriding the output of the multiplier 23. As shown in FIG. 7 the overflow logic circuit 25 has a priority encoder 27 to which the difference waveform is input. The priority encoder 27 determines the position of the most significant bit (MSB) of the difference waveform and develops a code word accordingly. For positive numbers this bit is the most significant "1", and for negative numbers this bit is the most significant "0". The code word from the priority encoder 27, which is preferably a PROM lookup table, is input to an overflow comparator 29 to which is also input the exponent gain value. If the comparison of the code word with the exponent gain value indicates an overflow condition, the overflow bit from the overflow comparator 29 is set indicating that the difference waveform is out of range, and the lookup table 45 uses the sign bit together with the overflow bit to output the maximum (+) or minimum (−) mixer control waveform. If the overflow bit is not set, the lookup table 45 translates the output of the multiplier 23 along with the sign bit into the desired output.

The desired gain value is input to the clip and gain circuit 10 in a normalized floating point form, and is split into an exponent gain value and a mantissa gain value by either software at the input interface or by a hardware lookup table. Table I illustrates some typical gain values and the conversion into exponent and mantissa gain values

TABLE I

| Gain | Exponent | Mantissa |
| --- | --- | --- |
| 0.00 | 0 | 0.00 |
| 0.50 | 0 | 0.50 |
| 1.00 | 0 | 1.00 |
| 1.50 | 0 | 1.50 |
| 2.00 | 1 | 1.00 |
| 2.50 | 1 | 1.25 |
| 3.00 | 1 | 1.50 |
| 3.50 | 1 | 1.75 |
| 4.00 | 2 | 1.00 |
| 6.00 | 2 | 1.50 |
| 8.00 | 3 | 1.00 |
| . | . | . |
| . | . | . |
| . | . | . |

The exponent and mantissa values each start at zero for a gain of zero. As the gain increases the mantissa value follows until the gain equals two, at which point the exponent increases to one and the mantissa drops back to 1.00. The mantissa then continues to increase with rising gain until the gain is 4.00, when the exponent increases to 2 and the mantissa again drops back to 1.00. This continues for the entire range of gains, with the mantissa varying from 1.00 to just less than 2.00, dropping back and incrementing the exponent at each multiple of two. This has the effect of reducing the fractional accuracy of the gain value for high numbers, and of reducing the total number of bits needed to be processed by the multiplier stage 30.

The multiplier 23 in the gain stage 30 also is much smaller in the number of bits handled than the conventional design because the present invention only provides the full fractional gain accuracy when necessary—at low gains. Further the output of the multiplier 23 is only the number of bits needed for the mixer control waveform since overflow detection is handled as a separate circuit. Finally the output precision and gain are well constrained since the input from the shifter 21 is only those bits needed to generate the desired mixer control waveform accuracy, not the entire difference waveform precision.

Although the lookup table 45 performs the level shifting and limiting functions, these functions could also be done in separate lookup tables or processed by separate special purpose circuits. Also the lookup table 45 may be used to apply waveform shaping to the mixer control waveform, such as S-shaping to prevent abrupt transitions at the limit points to reduce the appearance of "Mach bands", or transition derivative discontinuities, in the final video output.

Thus the present invention provides a digital clip and gain circuit which is simpler and less costly by reducing the size of the multiplier. The gain multiplication is treated in two steps: an exponent shift and a mantissa multiply. Also parallel overflow logic is used to avoid the need for a wide dynamic range multiplier.

What is claimed is:

1. An improved clip and gain circuit of the type having means for comparing an input waveform with a reference level to produce a difference waveform and means for amplifying by a gain value, level shifting and limiting the difference waveform to produce a control waveform, wherein the improvement comprises:
    means within the amplifying means for shifting the difference waveform according to an exponent gain value representing a power of two portion of the gain value; and
    means for multiplying the output of the shifting means by a mantissa gain value representing a fractional portion of the gain value.

2. An improved clip and gain circuit as recited in claim 1 further comprising means for determining from the difference waveform and the exponent gain value an overflow condition indicating that the output of the multiplying means is out of limits.

3. An improved clip and gain circuit as recited in claim 2 wherein the level shifting and limiting means comprise a lookup table having as inputs the output of the multiplying means, a sign bit from the difference waveform and an overflow bit from the determining means representing the over flow condition, the lookup table providing a maximum or a minimum value for the control waveform depending upon the sign bit when the overflow bit indicates the overflow condition, or providing a value for the control waveform representative of the output of the multiplying means and the sign bit when the overflow bit indicates no overflow condition.

4. A clip and gain circuit comprising:
    means for comparing an input waveform with a clip level to produce a difference waveform;
    means for shifting the difference waveform according to an exponent portion of a gain value, the exponent portion being a multiple of two; and
    means for multiplying the output of the shifting means by a mantissa portion of the gain value, the mantissa portion being a fractional portion of the gain value.

5. A clip and gain circuit as recited in claim 4 further comprising means for determining whether the product of the difference waveform and the exponent portion is out of range, an overflow bit being set to indicate such an overflow condition.

6. A clip and gain circuit as recited in claim 5 further comprising means for level shifting and limiting the output of the multiplying means to produce a control waveform.

7. A clip and gain circuit as recited in claim 6 wherein the level shifting and limiting means comprises a lookup table having as inputs the overflow bit, a sign bit from the difference waveform and the output of the multiplying means to provide maximum or minimum values for the control waveform when the overflow bit is set according to the value of the sign bit, and to provide an appropriate value for the output of multiplying means for the control waveform when the overflow bit is not set.

* * * * *